(12) United States Patent
Chiang (10) Patent No.: US 10,343,210 B2
(45) Date of Patent: Jul. 9, 2019

(54) ELECTRIC NAIL GUN STRUCTURE (71) Applicant: Hsin Ying Enterprise Co., Ltd., Taichung (TW)

(72) Inventor: Wen-Hung Chiang, Taichung (TW)

(73) Assignee: HSIN YING ENTERPRISE CO., LTD., Taichung (TW)

( * ) Notice: Subject to any disclaimer, the term of this patent is extended or adjusted under 35 U.S.C. 154(b) by 322 days.

(21) Appl. No.: 15/455,071

(22) Filed: Mar. 9, 2017

(65) Prior Publication Data
US 2018/0257130 A1 Sep. 13, 2018

(51) Int. Cl.
*B21J 15/04* (2006.01)
*B21J 15/10* (2006.01)
*B21J 15/26* (2006.01)
*B23D 29/00* (2006.01)
*B23D 29/02* (2006.01)

(52) U.S. Cl.
CPC ......... *B21J 15/105* (2013.01); *B21J 15/043* (2013.01); *B21J 15/26* (2013.01); *B23D 29/00* (2013.01); *B23D 29/02* (2013.01)

(58) Field of Classification Search
CPC ... B25B 27/0007; B25B 27/0014; B25C 1/00; B25C 1/06; B25C 1/001; B21J 15/26; B21J 15/10; B21J 15/105
See application file for complete search history.

(56) References Cited

U.S. PATENT DOCUMENTS

| | | | | | |
|---|---|---|---|---|---|
| 2,657,383 | A | * | 11/1953 | Ford | B25C 1/00 173/203 |
| 2,789,597 | A | * | 4/1957 | La Torre | B25B 27/0014 81/55 |
| 3,028,777 | A | * | 4/1962 | Essex | B25B 27/0014 81/55 |
| 3,280,921 | A | * | 10/1966 | Bickford | B25C 1/06 173/205 |
| 3,366,302 | A | * | 1/1968 | Blicharski | B25C 1/06 227/131 |
| 3,686,915 | A | * | 8/1972 | Miller | B21J 15/043 29/243.519 |
| 4,121,745 | A | * | 10/1978 | Smith | B25C 1/06 227/8 |
| 4,305,541 | A | * | 12/1981 | Barrett | B25C 1/06 227/114 |
| 4,384,622 | A | * | 5/1983 | Koziniak | B25C 1/001 173/117 |

(Continued)

Primary Examiner — Tyrone V Hall, Jr.
(74) Attorney, Agent, or Firm — Leong C. Lei (57) ABSTRACT

An electric nail gun structure is disclosed. A gun head seat body is formed into a structure with inner and outer cover layers, allowing a rotating rod and a slide piece moving a pull nail linearly to be configured inside it; the gun head seat body is formed completely by having a steel sleeve with equidistantly spaced slide chutes on the inside thereof covered with a plastic contact layer, where the slide chutes allows projecting ribs configured on the steel slide piece to be in engagement therewith so that a stable and safe nail pull operation can be obtained. Furthermore, a length extensible and width adjustable auxiliary handle rod is configured on the outside of the gun head seat body allowing nail gun seat bodies for all kinds of electric, pneumatic drills to be operated conveniently and safely with one single hand.

6 Claims, 8 Drawing Sheets

(56) References Cited

U.S. PATENT DOCUMENTS

| | | | | |
|---|---|---|---|---|
| 6,427,514 B1* | 8/2002 | Thiede | ............... | B21J 15/105 |
| | | | | 72/114 |
| 2008/0012453 A1* | 1/2008 | Aasgaard | ............ | B21J 15/043 |
| | | | | 310/75 R |
| 2008/0104814 A1* | 5/2008 | Buchanan | ......... | B25B 27/0007 |
| | | | | 29/240.5 |
| 2010/0054892 A1* | 3/2010 | Huang | ............... | B21J 15/043 |
| | | | | 411/14.5 |

* cited by examiner

ELECTRIC NAIL GUN STRUCTURE

TECHNICAL FIELD OF THE INVENTION

The present invention relates to an electric nail gun structure, capable of ensuring that the whole set of pull, control, drive structure is stable, allowing the nail pull operation to be safe and practical by configuring equally divided annular chutes on the inside wall of a sleeve made of steel inside a gun head body to engage with equally divided corresponding projecting ribs configured on a slide piece to allow the slide piece engaged with a rotating rod to be pulled and slid directionally, safely along the chutes when the rotating rod is turned.

DESCRIPTION OF THE PRIOR ART

Among conventional nail gun structures, the structure disclosed by Taiwan Patent No. M418762, titled "Nail Gun head structure", includes a nail gun head body, transmission rotating rod inside it and movable guide piece adapted to pull and control a nail pull shank through screws engaged therewith.

The Taiwan patent mentioned above mainly forms the cross section of the guide end of the movable guide piece into a polygon, and opens a through hole inside the head body, where the cross section shape of the through hole cooperates with the polygonal cross section of the movable piece, allowing the movable guide piece and the rotating rod structure turned therewith to be rotated and slid linearly at the same time upon a nail pull operation. Furthermore, bear parts can be increased with a polygonal surface between the movable guide piece and gun head body, thereby dispersing wear caused from the rotation and stretching, avoiding the wear and deformation of the movable guide piece or head body, and achieving the desired effect of the smooth reciprocating motion of the movable guide piece. But, the entire movable guide piece is subject to rotational torque and slide resistance of the outer-edge multilateral guide at the same time when of the motion of movable guide piece is being converted from the rotational drive to the linear slide. In order to decrease the slide friction, the contact surfaces of the movable guide piece and the head body are finished so as to reduce the resistance of each surface. However, this situation is limited by the appearance of the gun head body which is usually formed by means of plastic or aluminum, zinc die-forming, the texture thereof being softer such that the polygonal angular parts inside the head body will be worn and torn seriously when the movable guide piece made of metal is subject to twisting force, sliding force and others, resulting the deflection of the movable guide piece because the inner polygon corners are rounded by wear. More seriously, the movable guide part will be stuck incapable of being pulled; it is not only because the head body is designed inappropriately but because the rotation and slide wear is greater. Therefore, how to reduce the contact area thereof and improve relative covering guide to allow the rotating force and slide force to be guided separately, the design defects of the current nail gun can then be improved effectively.

SUMMARY OF THE INVENTION

The main object of the present invention is to provide an electric nail gun structure, covering a steel sleeve having slide chutes with plastic material and mounting a steel slide piece having projecting ribs inside the sleeve, thereby obtaining a safe, stable nail pull operation through the engagement of the slide chutes with projecting ribs.

Another object of the present invention is to provide an electric nail gun structure, allowing a length extensible, width adjustable auxiliary handle rod to be locked directly to a nail gun seat body of a general electric or pneumatic drill so that a user can carry out a nail pull operation safely with only one hand.

To achieve the objects mentioned above, the present invention proposes an electric nail gun structure, including a gun head seat body, rotating rod mounted therein in connection with and transmitted by a nail gun seat for the supply of power and a slide piece for the linear displacement of a nail upon nail pull and locked to the rotating rod, wherein the gun head seat body is built in with a sleeve made of steel and end head piece made of aluminum, and the outer side thereof is covered with plastic material, where a plurality of slide chutes spaced equidistantly are configured on the inner surface of the sleeve, allowing a plurality of key-typed projecting ribs to be engaged therewith correspondingly, thereby, when a screw piece locked to one end of the slide piece is engaged with and driven by the rotating rod, the projecting ribs are inserted in the corresponding slide chutes to slide axially and linearly smoothly; two sides of an end head piece of the gun head seat body are respectively configured with a screw hole, allowing an auxiliary handle rod constituted by two plastic extensible arms is locked directly to two sides of the gun head seat body with locking bolts through a through hole respectively configured on two sides on a front end of the auxiliary handle rod, and a long screw rod configured on one end of the auxiliary handle rod is used to adjust the clamping width thereof and simple locking and positioning thereof, allowing the nail gun seat body to be integrated therewith.

DETAILED DESCRIPTION OF THE PREFERRED EMBODIMENTS

An electric nail gun structure of the present invention, as FIGS. 1 to 7, mainly includes a gun head body 10, and a sleeve 11 made of steel mounted inside the gun head body 10, which is a long approximately stepped tube, where a section of external thread face 111 is configured on one end of the external annular surface on one end of the sleeve 11 with a larger diameter for the engagement of a round disk-shaped end head piece 13 made by means of aluminum extrusion therewith, two ends of which respectively have a projecting a screw hole seat; the combination of steel and aluminum extrusion material allows the entire weight to be reduced appropriately after the assembly, allowing light and convenient handling. Furthermore, the tubular inner surface of the sleeve 11 is formed into a stepped body, where one side of the sleeve 11 with a thicker wall has a smaller hole, and a plurality of indented slide chutes 14 spaced equidistantly are configured on the tubular inner surface; the interior of the sleeve 11 is fitted with a tubular rocket-shaped slide piece 20, one end of which with a larger diameter is configured with a plurality of projecting key-shaped ribs 21 corresponding to the plurality of slide chutes 14 for the engagement of the slide chutes 14 therewith, where the interior of conical end on the foremost part of the slide piece 20 is inserted with a conical end head formed of a pair of relatively half-shaped clamping blocks 22, the center of which is formed into a pass through hole, the wall of which is formed into a coarse holding surface which mostly is of a curved of V-shaped shape, capable of clamping accurately pull nail rods (30 of different diameter, when they are inserted therein. Furthermore, the bottom of the holding block 22 is pressed against by an assembled elastic push piece 23 inserted in slide piece 20, and a screw piece 24 is further engaged with and adapted to seat another end opening of the slide piece 20 to retain the push piece 23, where the center of the screw piece 24 is passed through with a screw hole 25 for engagement of a transmission-purpose rotating rod 26 therewith. For the supporting and rotating labor-saving requirements of the rotating rod 26, a bearing 27 is mounted in advance between the end head piece 13 and the end edge of the sleeve 11 before the sleeve 11 is in engagement with the end head piece 13, allowing the middle part of the rotating rod 26 to be positioned and supported stably after it is passed through to the inside of the sleeve 11 and engaged with the screw piece 24 on the end of the slide piece 20 so that the rotating rod 20 can be supported and linked stably when an electric or pneumatic nail gun seat is inserted to carry out power transmission rotation. Furthermore, a conical head 15 is engaged with the projecting outer end of the sleeve 11, thereby sealing the outer end of the sleeve 11 to complete the structure of the gun head. Furthermore, a pull nail positioning piece 16 is passed through and locked to the center end face of the conical head 15, where the center hole of the pull nail positioning piece 16 is the same as the pull nail rod 30 in diameter, allowing the inserted nail rod 30 not to be shaken or deflected upon a nail pull operation, ensuring the operation is safe.

The sleeve 11 made of metal and end head piece 13 are covered with plastic material to form to form the gun head body 10 with a curved appearance so that it can be grasped safely and comfortably. Upon use, the extended end of the rotating rod 26 of the gun head body 10 is inserted directly into the power output end of the nail gun seat body 40 for an electric or pneumatic drilling tool, allowing the rotating rod 26 to be rotated with the power output end to drive successively the screw piece 24 to rotate. But, because the projecting robs 21 of the slide piece 20 are engaged with the corresponding slide chutes 14 of the sleeve 11, the whole screw piece 24 cannot be rotated but slid linearly along the slide chutes 14 with the rotating rod 26. Upon a nail pull operation, the pull nail rod 30 is inserted deeply in the internal center of the clamping blocks 22 of the slide piece 20 from the outside of the conical head 15, and a positioning end plate 32 of a nail head 31 inserted into and stuck to the outer end of the conical head 14. Thereafter, a workpiece plate 33 is put around and abutted against the outside of the bottom end plate 32 of the nail head 30. Thereafter, the gun seat body 40 is started to cause the rotating rod 26 to be turned, allowing the slide piece 20 to be slid inward through the spiral pull of the screw piece 24, and the head of the rotating rod 26 is locked in to pressed against the elastic push piece 23, pushing the clamping blocks 22 to move toward each other to clamp nail rod 30 naturally, thereby pulling the nail rod 30 inward to caused the deformation of the nail head 30 to approximate a riveting operation. Furthermore, the connection between the nail rod 30 and nail head 31 is pulled off to complete the nail pull operation.

Figure 1:
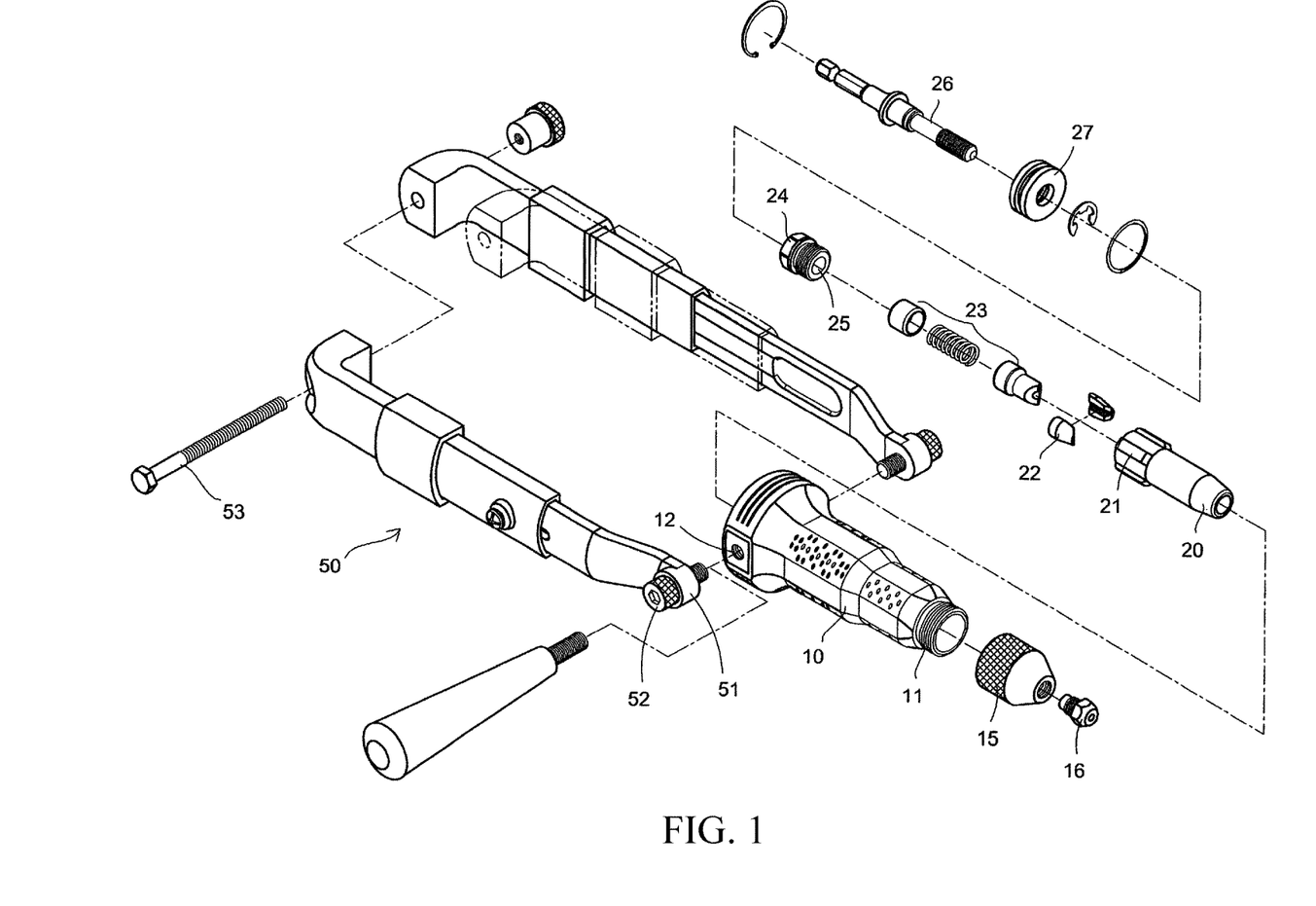
FIG. 1 is an exploded view of a gun head seat structure according to the present invention.
Figure 2:
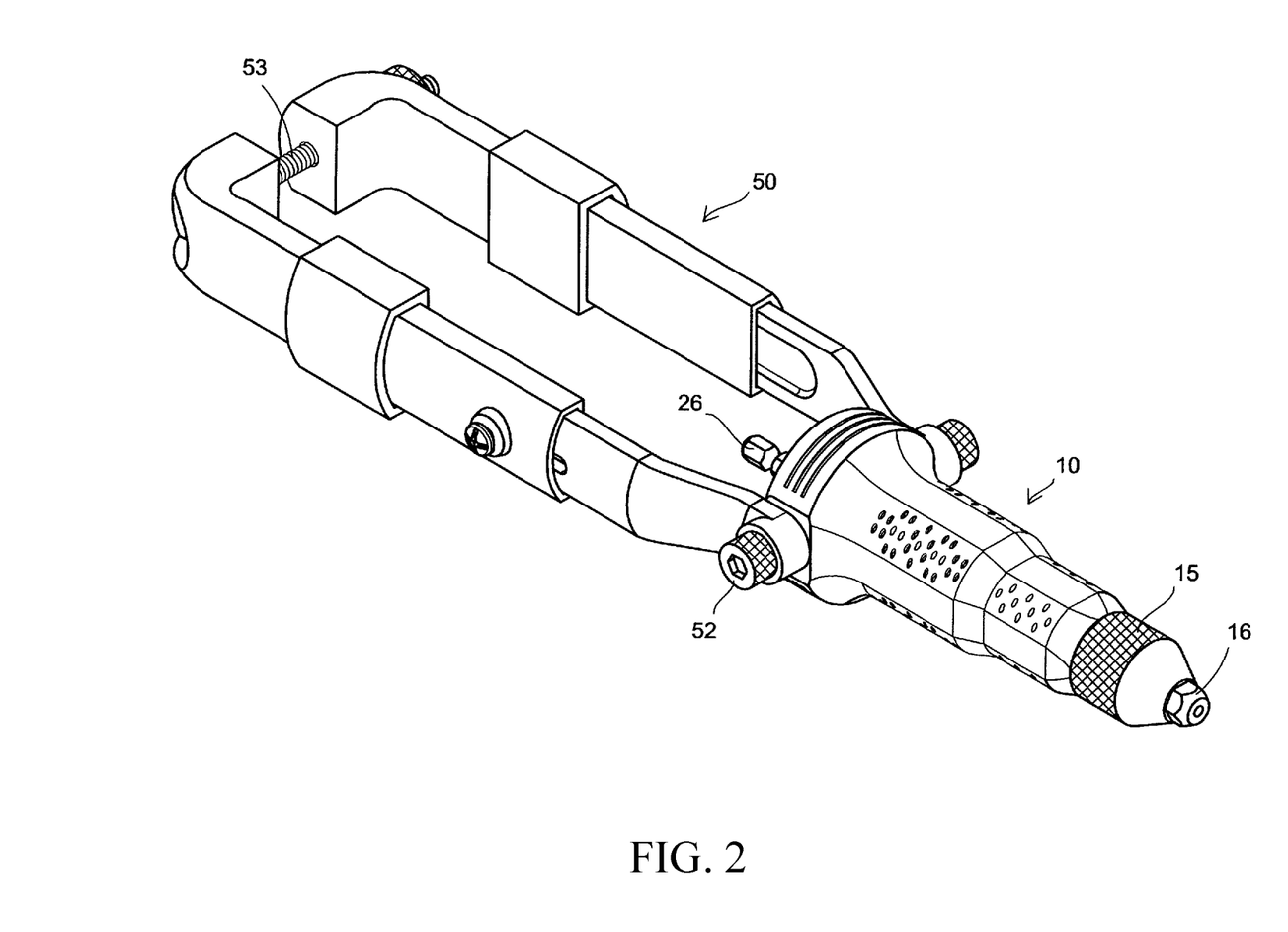
FIG. 2 is perspective view of the gun head seat structure of the present invention.
Figure 3:
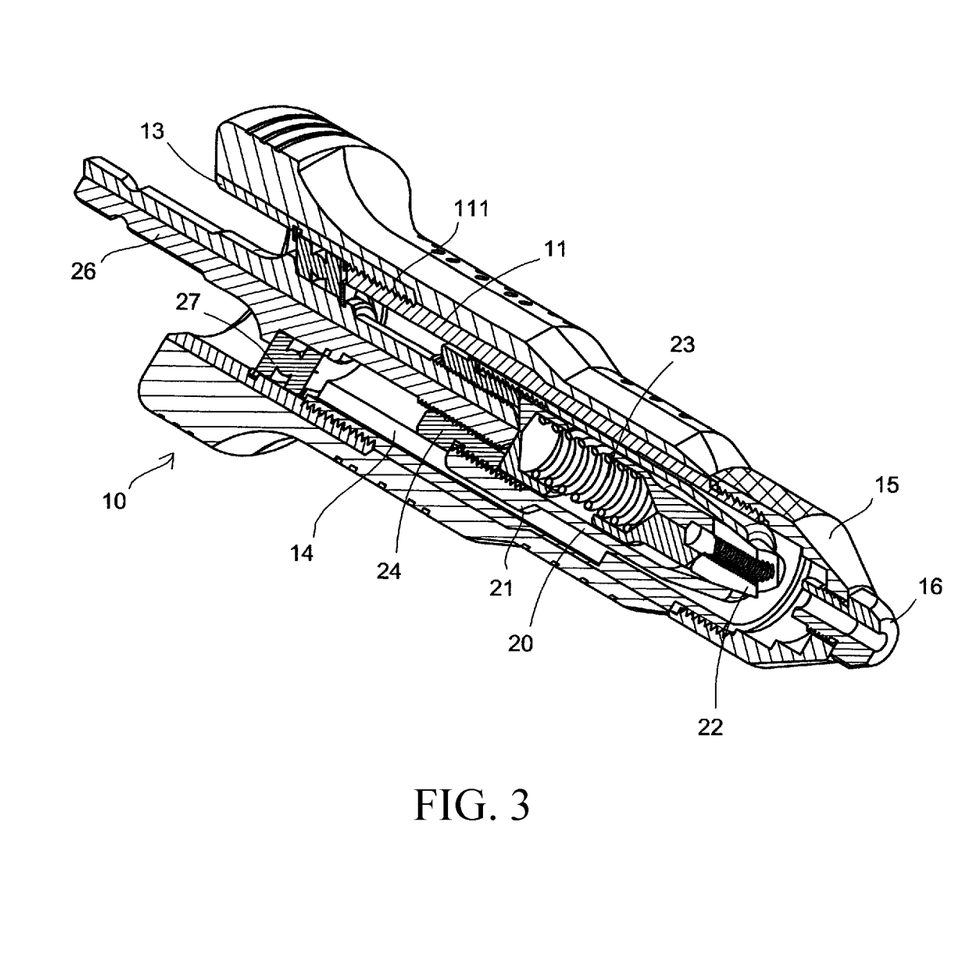
FIG. 3 is a partly cut-off perspective view of the gun head seat of the present invention.
Figure 4:
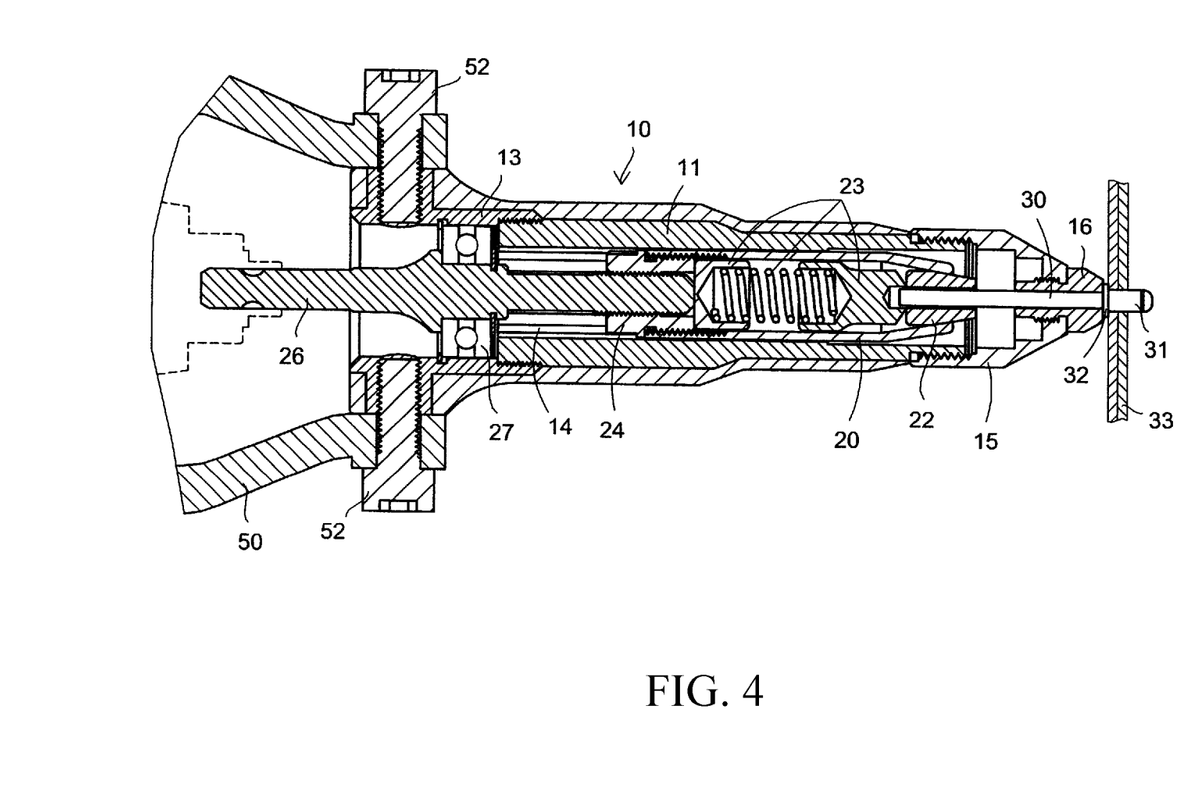
FIGS. 4 and 5 respectively are a cross-sectional view of the present invention upon a nail pull operation.
Figure 5:
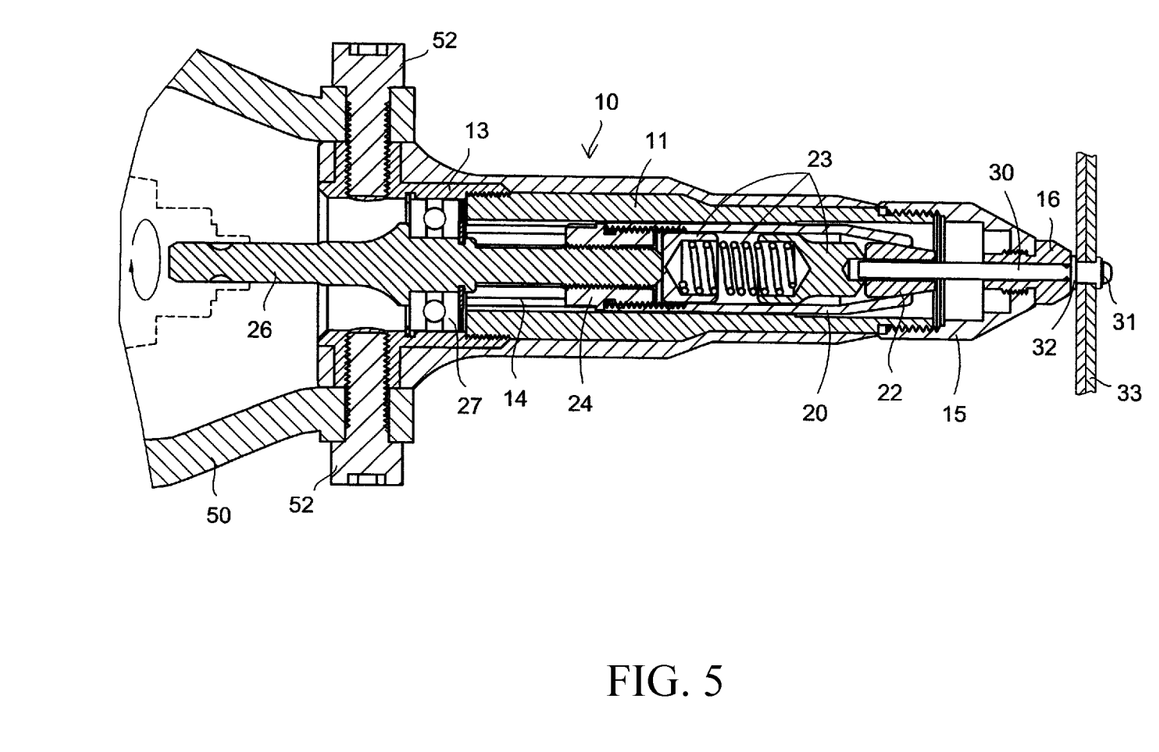
Figure 6:
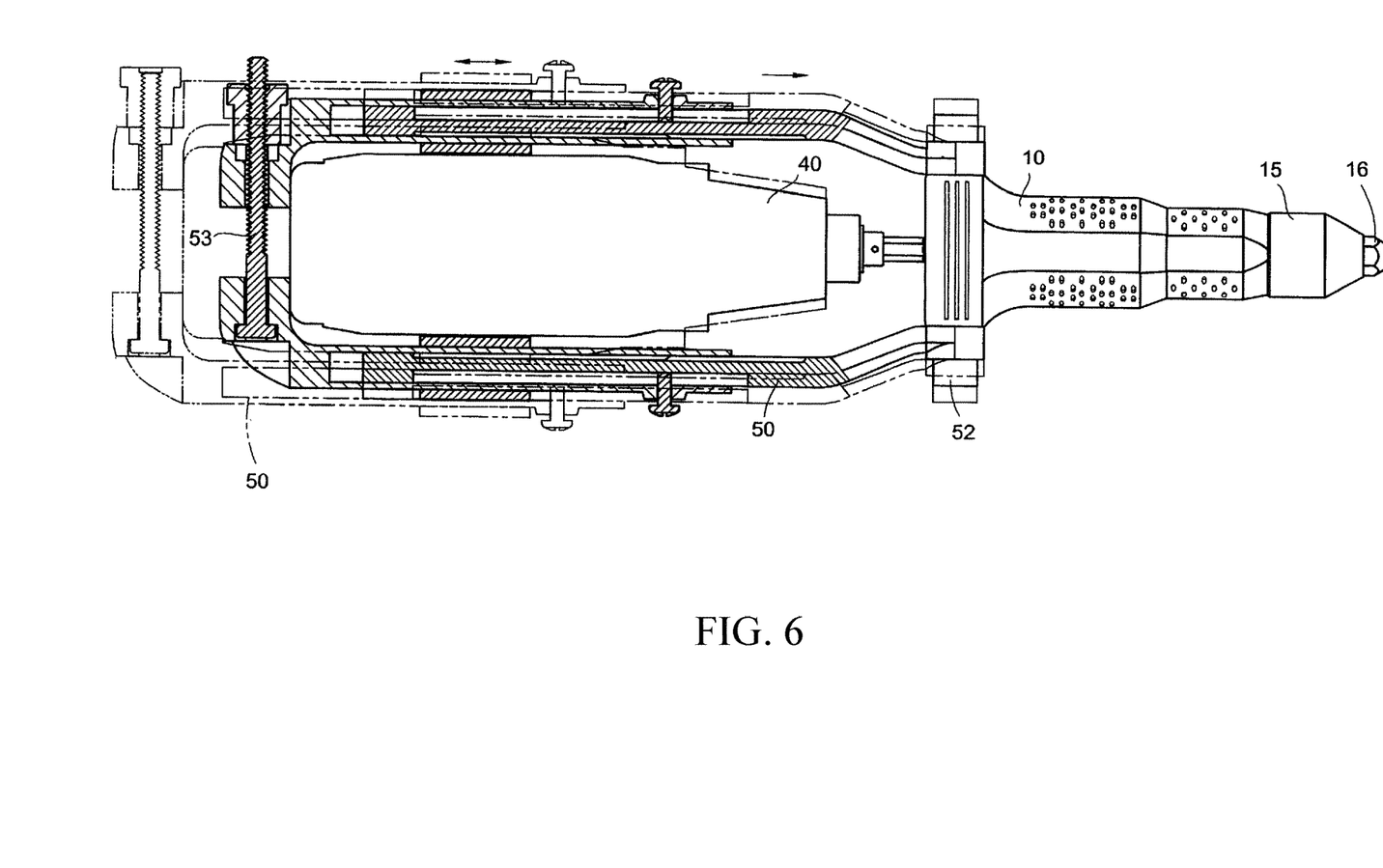
FIG. 6 is a schematic view of an auxiliary handle rod according to the present invention after assembly.
Figure 7:
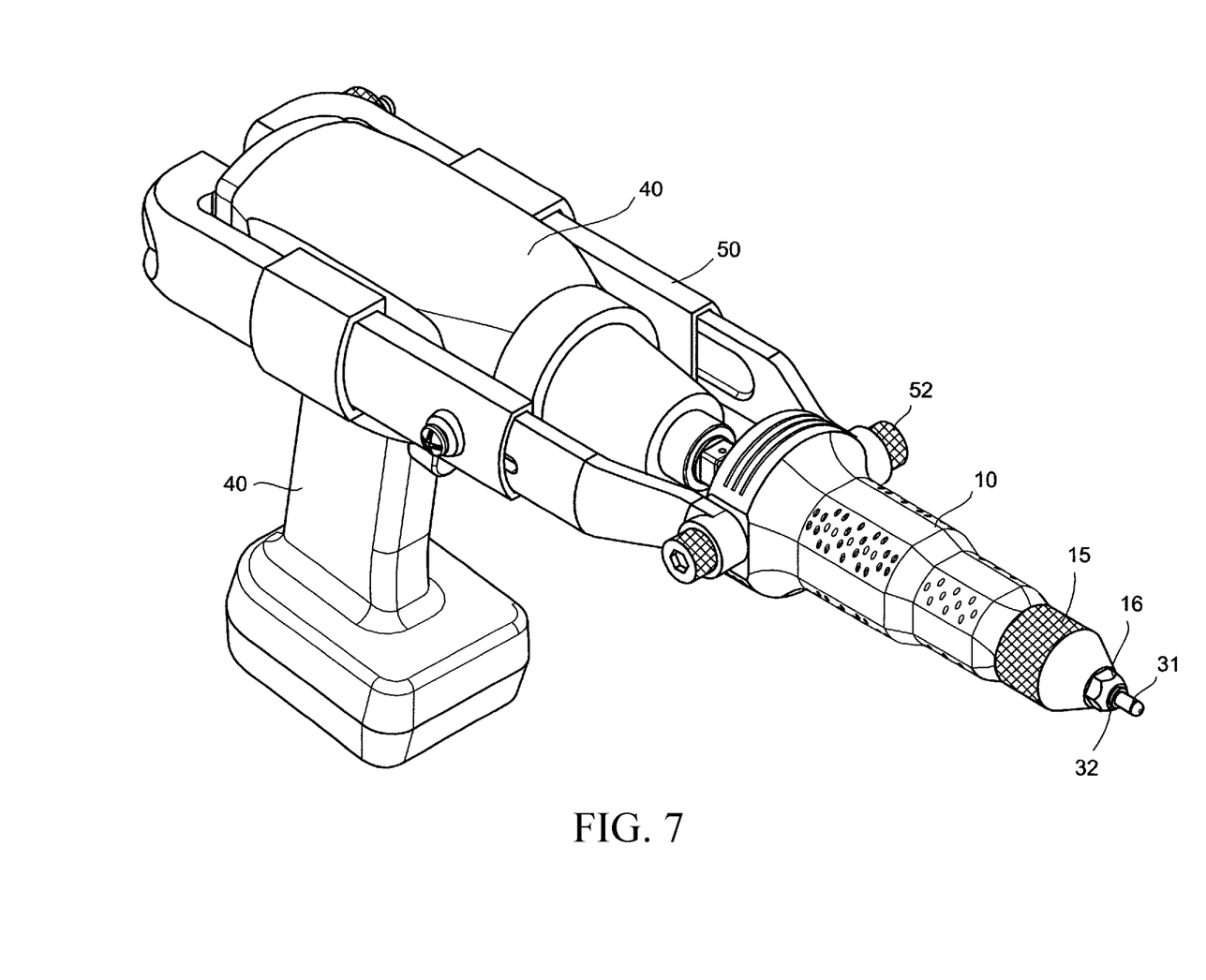
FIG. 7 is a perspective view of a nail gun of the present invention in a use state.

Furthermore, a pair of plastic extensible arms combined with each other to form a U-shaped auxiliary handle bar 50 with a through hole 51 respectively configured on the two front ends thereof are locked directly to the gun head seat body 10 by using a locking bolt 52 to lock each pair of corresponding screw hole 12 and through hole 51; a long bolt 53 configured on the end of the relative arms is used to adjust the clamping width thereof and the simple positioning thereof, allowing the auxiliary handle rod 50 to be integrated with the gun seat body 40 to provide a simple integrated assembly of the gun head body 10 and nail gun seat after applied to abut against the nail gun seat body 40. Therefore, the present invention is convenient for a user to complete a nail pull operation by a single hand so that the operation is safe, labor-saving, convenient and practical.

Figure 8:
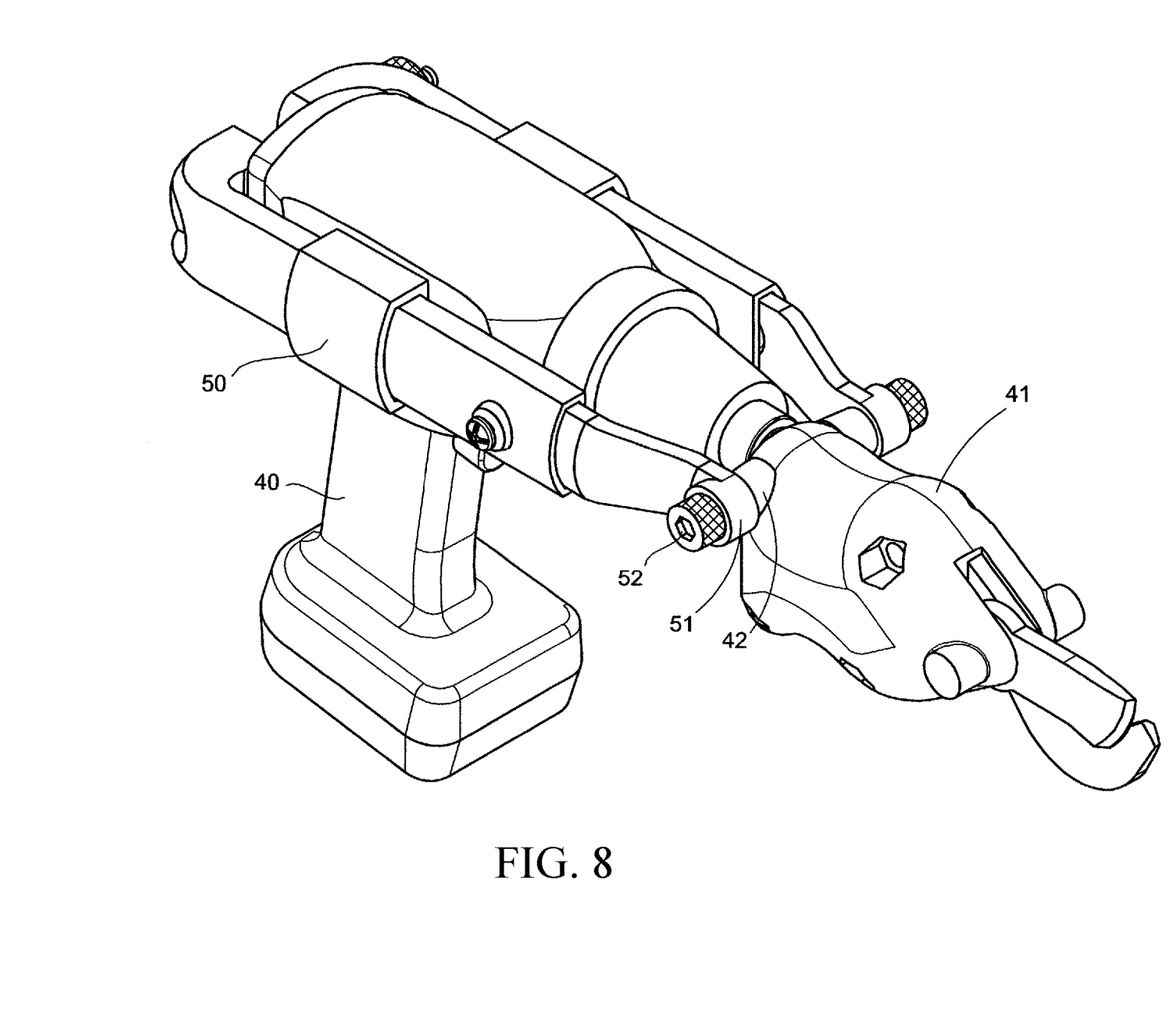
FIG. 8 is a perspective view of the auxiliary handle rod of the present invention when combined with electric scissors.

The auxiliary handle rod 50 assembly, as FIG. 8 shows, can be used by combining with electric scissors 41; the electric scissors 41 can be integrated with the nail gun seat body 40 through by locking the electric scissors 41 to the auxiliary handle rod 50 through two screw holes 42 of the electric scissors 41 with the bolt 52 because the same nail gun seat power source is used, achieving the practical effect of a single-hand operation.

I claim:

1. An electric nail gun structure, comprising a gun head seat body, rotating rod mounted therein in connection with and transmitted by a nail gun seat for the supply of power and a slide piece for the linear displacement of a nail upon nail pull and locked to said rotating rod, wherein said gun head seat body is built in with a sleeve made of steel and end head piece made of aluminum, and the outer side thereof is covered with plastic material, where a plurality of slide chutes spaced equidistantly are configured on the inner surface of said sleeve, allowing a plurality of key-typed projecting ribs to be engaged therewith correspondingly, thereby, when a screw piece locked to one end of the said slide piece is engaged with and driven by said rotating rod, said projecting ribs are inserted in said corresponding slide chutes to slide axially and linearly smoothly; two sides of an end head piece of said gun head seat body are respectively configured with a screw hole, allowing an auxiliary handle rod constituted by two plastic extensible arms is locked directly to two sides of said gun head seat body with locking bolts through a through hole respectively configured on two sides on a front end of said auxiliary handle rod, and a long screw rod configured on one end of said auxiliary handle rod is used to adjust the clamping width thereof and simple locking and positioning thereof, allowing said nail gun seat body to be integrated therewith.

2. The structure according to claim 1, wherein said sleeve is a stepped long tube-typed body, one end thereof with a larger diameter is in engagement with said round disk-typed end head piece.

3. The structure according to claim 1, wherein said projecting ribs of said slide piece are configured on a outer surface of one end thereof with a larger diameter, a pair half-type clamping blocks opposite to each other are inserted in a conical end of said slide piece, an bottom end of said clamping blocks is pressed against by an assembled elastic push piece, allowing said rotating rod to be turned into said slide piece to push said push piece and thus to drive said clamping blocks to clamp a pull nail when a screw piece on another end of said slide piece is engaged with and driven by said rotating rod.

4. The structure according to claim 3, wherein said clamping blocks are formed into a conical end head and central hole thereof has a coarse clamping surface.

5. The structure according to claim 1, wherein a bearing is mounted on an end edge where said sleeve is in engagement with said end head piece, thereby forming the auxiliary positioning and supporting of a middle section of said rotating rod.

6. The structure according to claim 1, wherein said auxiliary handle rod is capable of the use thereof with electric scissors in combination with said nail gun seat body.

* * * * *